Oct. 6, 1953

R. M. WILMOTTE 2,654,806

FM SYSTEM

Filed July 12, 1950

INVENTOR.
RAYMOND M. WILMOTTE
BY Hyman Hurvitz
his ATTORNEY

Patented Oct. 6, 1953

2,654,806

UNITED STATES PATENT OFFICE 2,654,806

FM SYSTEM

Raymond M. Wilmotte, Washington, D. C., assignor to Padevco, Inc., Washington, D. C., a corporation of Delaware Application July 12, 1950, Serial No. 173,345

12 Claims. (Cl. 179—15)

Figures 1, 2:
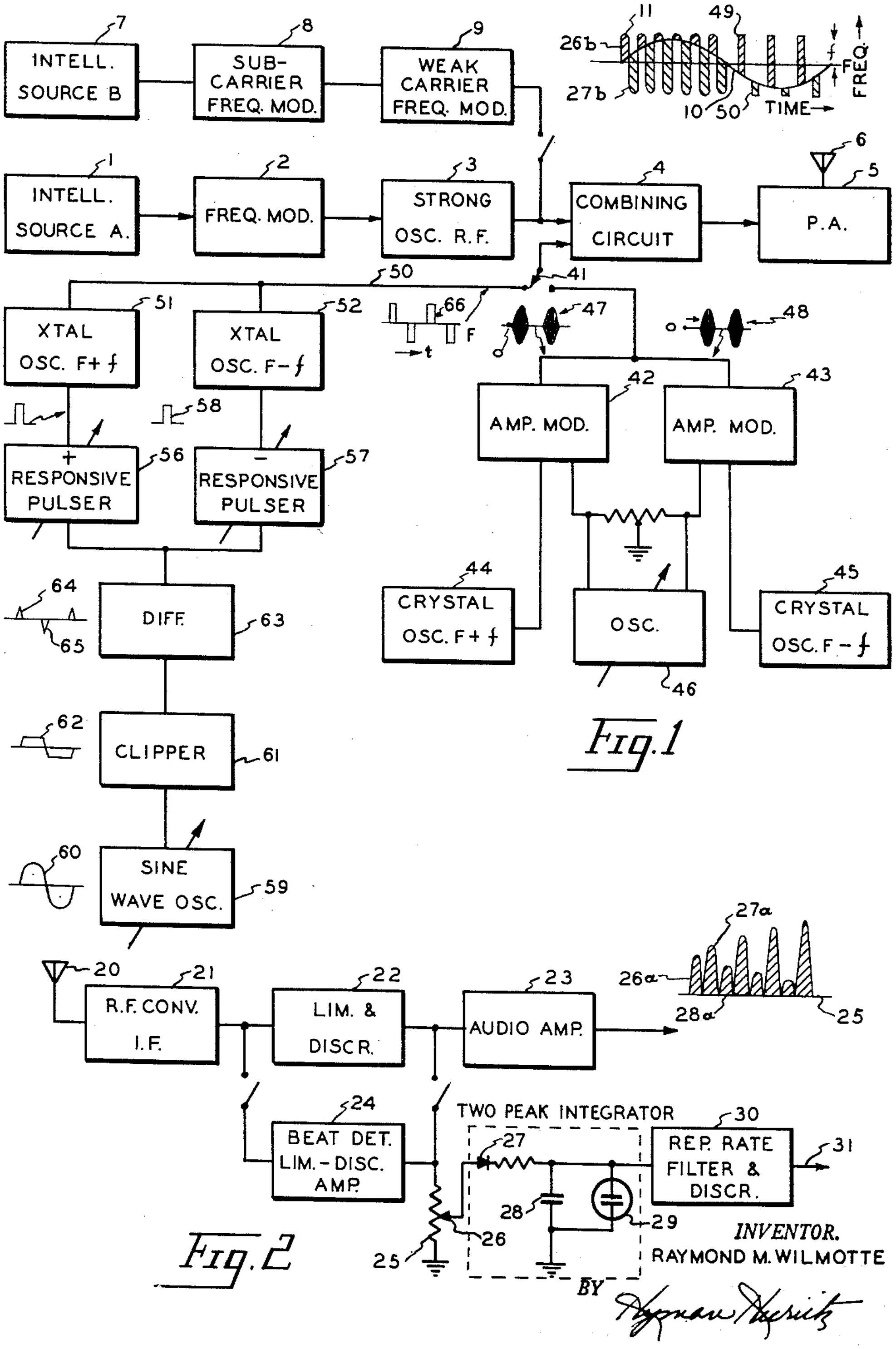

The present invention relates generally to systems of communication by means of frequency modulated waves, and particularly to systems for transmitting in a channel otherwise occupied by a random frequency modulated wave, auxiliary frequency modulated signals which do not interfere with the first mentioned frequency modulated waves, and which are themselves susceptible of detection at constant amplitude and frequency regardless of the instantaneous character of the first mentioned wave.

It is the broad object of the present invention to provide a novel system of communication by means of frequency modulated carriers.

It is a further object of the invention to provide a novel system of communication of control signals which utilizes a channel otherwise occupied by a frequency modulated wave.

A further object of the invention resides in the provision of a system of communication wherein a main or relatively strong frequency modulated carrier occupies a given channel, and wherein auxiliary information is transmitted on an auxiliary frequency modulated carrier occupying the same channel and having amplitude less than the amplitude of the main carrier.

Another object of the invention resides in the provision of a system for transmitting information in a channel occupied by a main frequency modulated carrier, by transmitting conjointly with the main frequency modulated carrier, a weaker auxiliary carrier which is frequency modulated to constant deviations at a controllable rate.

It is another object of the invention to provide a system of communication by means of frequency modulated waves, wherein an auxiliary relatively weak carrier is transmitted in a channel otherwise occupied by a relatively strong frequency modulated carrier, the relatively weak carrier having frequency deviations of constant amount and of sufficient extent to assure that periodic cross-overs of the frequencies of the carriers will occur.

The above and still further features, objects and advantages of the invention will become apparent upon consideration of the following detailed description of a specific embodiment thereof, especially when taken in conjunction with the accompanying drawings, wherein:

Figure 1 is a block diagram of a transmitter arranged in accordance with the invention; and, Figure 2 is a block diagram of a receiver in accordance with the invention, for receiving signals transmitted by the transmitter of Figure 1.

Briefly described, there is provided in accordance with the present invention a relatively strong frequency modulated carrier, which occupies an assigned channel, and which has maximum deviations as provided by the regulations of the Federal Communications Commission.

In this same channel is transmitted a relatively weak carrier, which is frequency modulated preferably at a supersonic rate, with deviations extending approximately to the limits of the assigned channel, in a preferred embodiment of the invention, although lesser deviations may be utilized with satisfactory results. The frequency of the deviations of the relatively weak carrier may be controlled, so that this frequency represents information. Since the relatively weak carrier is deviated constantly to the same value, while the strong carrier is deviated to extents determined by the amplitudes of a modulating signal which may vary more or less at random with respect to a zero value, it follows that during each cycle of deviation of the relatively weak carrier, the frequencies of the two carriers will intersect.

The stronger carrier may be received by means of a conventional frequency modulation receiver, and its modulations detected. The joint presence of the strong and weak carriers results in beat frequencies between the carriers, in a suitable beat detection channel, and these beat frequencies are of zero value when the carriers intersect, and have at each instant of time a frequency determined by the difference in frequencies of the carriers at that instant of time. If then, we assume the frequency of the strong carrier to remain constant for a short period of time, while the deviations of the weak carrier pass through several cycles, it will be apparent that the peak frequency of the beats occurring while the weak carrier is on one side of the strong carrier, plus the peak frequency of the beats occurring while the weak carrier is on the other side of the strong carrier, remain constant, and will, in fact, be substantially equal to twice the total deviations of the weak carrier in a given direction, or equal to the total deviation of the weak carrier in both directions.

This fact is made use of in the present invention, by detecting the beat frequencies between the carriers, by measuring the peaks of the beat frequencies, and developing voltages of given direction in response to these peaks, and by summing the peaks in adjacent pairs. The sum of two adjacent peaks remains substantially constant regardless of the value of the frequency of the main carrier at the time under consideration, so that the sum voltages so taken remain of constant amplitude, but occur at the frequency of the deviations of the auxiliary carrier. The voltages may then be utilized to perform control functions.

Referring now more particularly to Figure 1 of the accompanying drawings, the reference numeral 1 identifies a source of intelligence, identified as intelligence A to distinguish it from other intelligence transmitted in the system. The signal provided by intelligence source A is applied to a frequency modulator 2 which, in resuonse to these signals, frequency modulates a relatively strong oscillator 3, which generates radio frequency oscillations suitable for transmission in an assigned FM channel. These oscillations are passed through a combining circuit 4 to a power amplifier 5, which raises the amplitude of the oscillations to a relatively high value and applies them to a broadcast antenna 6. The system as so far described corresponds with a conventional frequency modulation transmitter.

There is provided an additional intelligence source B, identified by the reference numeral 7, which is utilized to modulate the frequency of a sub-carrier in a sub-carrier frequency modulator 8, and the latter in turn is utilized to frequency modulate a relatively weak R. F. carrier provided by a frequency modulated oscillator 9. The sub-carrier provided by the source 8 is of constant amplitude, and varies only in frequency in response to intelligence source 7, and accordingly the deviations of the weak R. F. carrier provided by the source 9 possess deviations of constant extent in each direction. The output of the weak carrier frequency modulator 9 is applied to combining circuit 4, amplified by power amplifier 5 and radiated by antenna 6, care being taken that as radiated the output of the weak carrier frequency modulator 9 is smaller in amplitude than that provided by the strong R. F. oscillator 3.

If the frequency of the unmodulated strong carrier be F, the instantaneous frequency of the strong carrier may be represented by the wave 10, and the frequency deviations of the weak carrier by the wave 11, on the assumption that the weak carrier has the same mean value of F as does the strong carrier. As will become obvious as the description proceeds, it is not essential to the present invention that the two carriers have the same mean frequency, provided they remain within the same channel, and the latter is required only to comply with the regulations of the Federal Communications Commission. It is further assumed that the maximum deviation $f$ of the weak carrier may exceed at all times the maximum deviation of the strong carrier, or at least that this is true for the major portion of the operating time. The maximum deviation $f$ of the weak carrier need not, accordingly, bring the weak carrier to the edge of the assigned channel, since the strong carrier, in practice, is deviated but infrequently to its maximum allowable extent.

When the two carriers are conjointly received, beats between the carriers may be detected. These beats have at each instant a frequency representative of the frequency difference between the two carriers. Accordingly, the beat frequency posesses values equal at each instant to the difference between the ordinates of plots 10 and 11; since, however, the beat frequencies are always positive, a plot of beat frequencies would show these always to be in the same direction. If a full cycle of sub-carrier modulation be considered, it will be clear that the sum of the beat deviation of the weak carrier with respect to the strong carrier at 10, rather than with respect to the mean value of the weak carrier, when considered in both directions, i. e., positively and negatively with respect to the value at that instant of the main carrier, is a constant, and is equal to the total deviation in both directions of the beat carrier. If then, the beats between the carriers can be detected and measured, to determine their peak values, and if two adjacent peak values can be algebraically added, or summed, the sum will be of constant magnitude, and will not be dependent upon the value of the instantaneous deviation of the strong carrier. The maximum values of the sum of the two peak values will occur at the same rate as the weaker carrier is modulated, i. e., one peak will occur for each cycle of deviation of the weak carrier.

Referring now to Figure 2 of the accompanying drawings the reference numeral 20 represents a receiving antenna which supplies both the strong and the weak carriers transmitted by the transmitter of Figure 1 to a radio frequency stage, a converter and an intermediate frequency amplifier, 21. The output of the latter may be applied to a limiter and discriminator 22, which detects frequency modulations of the stronger carrier, and is not affected by the presence of the weaker carrier, in accordance with principles which are well known in the art of frequency modulation, and which accordingly need not be explained herein. The output of the limiter-discriminator 22 may be applied to an audio amplifier 23, on the assumption that the source of intelligence A provides audio signals, and utilized in any desired manner, as by application to a loud speaker or the like.

From the intermediate frequency amplifier comprised in unit 21 may be derived an amplitude modulated signal, corresponding at each instant with the sum of the strong and weak carriers, the amplitude modulation representing a beat between the carriers, and having at each instant a frequency equal to the difference between the frequencies of the carriers. This amplitude modulated signal may be detected by means of a unit 24 comprising a beat detector, which may be a conventional amplitude detector, and which under ideal conditions provides beat signals of constant amplitude, associated with a limiter and discriminator, which detects the frequency of the beats, as well as an amplifier for amplifying frequency detected resultant. Alternately, the beats may be derived directly from the output of limiter-discriminator 22. Accordingly, at the output of the unit 24 will be present voltage waves, as at 25, corresponding in amplitude with the frequencies of the beats. The plot 25, corresponds generally with the plot 11 of Figure 1, comprising a lobe 26$a$, which corresponds with the lobe 26$b$ in Figure 1, a lobe 27$a$ which corresponds with the lobe 27$b$ in Figure 1, and so on. While the peaks of the lobes of signal portrayed at 25 in Figure 2 depend upon the amplitude of the signal provided by intelligence A at each instant of time, when two adjacent lobes are summed, their sum will be found to be constant, for reasons explained hereinabove. Additionally, the sum will be found to be constant whether two adjacent peaks 26$a$ and 27$a$ are summed, or whether the peak 27$a$ is summed together with a succeeding peak as 28$a$, the constancy of this summation being an approximation which assumes the deviations of the wave 10 to remain constant during the time under consideration, an approximation which is nearly true in practice.

The output of the unit 24 is applied to a voltage divider 25, from which a predetermined voltage is taken by a slider 26, and applied via a rectifier 27 to a condenser 28. Since the rectifier 27 prevents discharge of the condenser 28 the condenser acts as a summing device, acquiring an increment of voltage during each one of the pulsations 26*a*, 27*a*, 28*a*, which is proportional to the area and hence to the amplitude of the pulsation. Connected across the condenser 28 is a discharge tube 29, which ionizes when the condenser attains sufficiently high voltage and discharges the condenser. By suitable selection of circuit constants, the condenser may be caused to discharge whenever the total voltage thereacross equals that due to some preselected value greater than ½ the sum of a pair of adjacent pulses as 26*a*, 27*a*, 28*a* and preferably due to nearly the sum of two adjacent pulses, but does not discharge in response only to one of these pulses, unless that one pulse is sufficiently greater than the mean value of the pulses, as occurs, for example, when the wave 10 approaches its maximum deviations. It follows that the condenser 28 will discharge substantially from a constant voltage, i. e., from a voltage equal to the discharge voltage of tube 29, at a rate of recurrence determined by the frequency of the subcarrier which modulates the weak carrier of the system. Discharging of condenser 28 provides, then, a periodic voltage, which may be filtered out and detected by a repetition rate filter and detector 30, the output of which may be made available on the lead 31 and utilized for any desired control purpose. If intelligence B represents an audio signal, the signal on the lead 31 will correspond with the same audio signal and may be audibly translated. If the repetition rate remains relatively constant and is transmitted for control purposes, or if the intelligence source keys the frequency modulator 2 on and off, the signal on the lead 31 will be similarly keyed.

Referring now to Figure 1 of the accompanying drawings, it will be clear that the shape of the deviations 26*b*, 27*b*, as distinguished from their peak values, does not involve the essence of the present invention, and that these deviations may be caused to occur in other ways than by frequency modulating the weak carrier in response to a substantially sinusoidal sub-carrier. More specifically, the weak carrier may be deviated at discrete intervals, in opposite directions, and to the same extent, if desired. To this end, the frequency modulated weak carrier source 9 may be disconnected from the system by means of a manual switch 40, and there may be connected to the combining circuit 4, by means of a further manual switch 41, a pair of amplitude modulators 42, 43, which normally provide no output, and to the input of which are connected crystal controlled oscillators 44 and 45 respectively, the crystal controlled oscillator 44 having a frequency $F+f$, and the crystal controlled oscillator 45 a frequency $F-f$. The amplitude modulators 42 and 43 may be turned on, in sequence, by applying thereto in opposite phase the output of a control oscillator 46, the latter preferably being of controllable frequency. When the oscillator 46 applies a positive signal to the amplitude modulator 42, a carrier deriving from crystal oscillator 44 at frequency $F+f$ is applied to the combining circuit 4, the frequency of this signal remaining constant, and its amplitude having an envelope as at 47. On alternate half cycles of the oscillator 46 negative voltage is applied to the amplitude modulator 42, and positive voltage to the amplitude modulator 43, so that only the latter transmits pulses of signal provided by the crystal oscillator 45, as shown at 48. In terms of frequency, the weak carrier transmitted possesses one of two values, either $F+f$, or $F-f$, and the beat frequency between the main carrier and the pulses of weak carrier are as illustrated at 49, while crystal oscillator 44 is transmitting and at 50 while crystal oscillator 45 is transmitting.

At the receiver the operation is identical with that which takes place while the weak carrier is frequency modulated by a sub-carrier, such operation having been sufficiently explained hereinabove, and accordingly requiring no repetition at this point.

The manual switch 41 may be utilized to connect the combining circuit 4 to a lead 50. To the lead 50 are connected two crystal oscillators 51 and 52, both of which are normally in a non-oscillating condition, and both of which may be caused to oscillate in response to a voltage pulse. The oscillator 51 provides a frequency $F+f$ and the oscillator 52 a frequency $F-f$.

The crystal oscillator 51 is rendered operative in response to a pulse as 53 which is generated by a positive signal responsive pulser 56, which may be of the flip-flop type, and which operates to generate a pulse of controllable duration, in response to a short positive pulse. Pulse generators of this character are well known per se and accordingly the circuit diagram and mode of operation of the pulser is not provided. Similarly a further pulser 57 is provided which generates positive pulses 58 for crystal oscillator 52, but the pulser 57 is a negative signal responsive pulser, or generates a pulse of controllable duration when there is applied thereto a short negative pulse. Pulse generators of this character are well known, and accordingly further disclosure of the details of the pulser 57 are dispensed with.

Control signals for the pulsers 56 and 57 are generated as follows. A sine wave oscillator 59 is provided, the frequency of which is subject to control in the usual fashion, and the output of which, having a wave form as at 60, is applied to a clipper 61 which provides at its output flat top waves as at 62. These are applied to a differentiator 63, which generates short pulses, of positive polarity while the wave form 62 is increasing and of negative polarity while the wave form 62 is decreasing, as at 64 and 65 respectively. These pulses are then applied to the pulsers 56 and 57 for controlling the latter, and the R. F. pulses present on the lead 50 then follow the character indicated by the plot 66, i. e., consists of discrete pulses of radio frequency signal, having values in alternation of $F+f$, and $F-f$, of controllable rate and durations.

The character of the beat signals produced by the latter pulses is essentially that illustrated at 49, 50, and the receiver of Figure 2 is suitable for demodulating the beat signals and deriving control signal therefrom, in the manner disclosed hereinabove.

While I have described and illustrated specific forms of the invention it will be clear that variations thereof may be resorted to without departing from the true scope of the invention as defined in the appended claims.

What I claim and desire to secure by Letters Patent of the United States is:

1. In combination, a source of main carrier having predetermined mean frequency, means for modulating said main carrier at a predetermined amplitude and with predetermined maximum frequency deviations, a source of auxiliary carrier having less than said predetermined amplitude, means for modulating said auxiliary carrier in frequency alternately in deviations of opposite sense and constant value, said main and auxiliary carriers being in the same frequency channel and overlapping in frequency, means for controlling the rate of occurrence of said last named deviations, and means for deriving the modulations of said auxiliary carrier in response to both transmitted modulated carriers.

2. The combination in accordance with claim 1 wherein said last means comprises means for detecting the beat frequency bursts between said carriers, and means for detecting the rate of occurrence of said bursts as a measure of the rate of occurrence of said last named deviations.

3. The combination in accordance with claim 1 wherein said last named deviations occur at a supersonic rate and said first named deviations occur at a sonic rate.

4. The combination in accordance with claim 1 wherein said carriers have the same mean frequencies.

5. The combination in accordance with claim 1 wherein said last means comprises means for detecting the beat frequency bursts between said carriers, means for measuring the peak beat frequencies of said bursts for developing potentials of the same polarity in response to each of said bursts, said potentials having magnitudes proportional to said peak beat frequencies, and means for summing adjacent pairs of said potentials to derive control signals of substantially constant amplitude at the recurrence rate of the deviations of said auxiliary carrier.

6. In combination, a source of main carrier having a predetermined mean frequency and a predetermined amplitude, means for frequency modulating said main carrier to predetermined maximum frequency deviations, means for transmitting the frequency modulated main carrier, a source of auxiliary carrier having alternately frequency values above and below the instantaneous frequency of said main carrier during modulation of the latter and an amplitude smaller than the amplitude of said main carrier, means for transmitting said carriers, and means responsive to the beat frequency between said carriers for substantially reproducing the rate of frequency deviation of said auxiliary carrier.

7. The combination in accordance with claim 6 wherein said source of auxiliary carrier is a source of frequency modulated waves.

8. The combination in accordance with claim 6 wherein said source of auxiliary carrier is a pair of oscillation sources each of fixed frequency, and wherein is provided means for transmitting said oscillations in alternation.

9. The combination in accordance with claim 6 wherein is further provided means for varying the rate of alternation of frequency values of said auxiliary carrier.

10. In combination, a source of main carrier, a source of audio signals, means for frequency modulating said main carrier in response to said audio signals within a communication channel of predetermined frequency width, means for transmitting said main carrier substantially at a fixed amplitude, a source of auxiliary carrier varying in frequency in alternation between values adjacent the edges of said communication channel and at a frequency above the highest frequency of said audio signals, means for transmitting said auxiliary carrier at an amplitude below the amplitude of said main carrier, and means responsive jointly to said cariers for detecting the rate of frequency variation of said auxiliary carrier.

11. The combination in accordance with claim 10 wherein said last means is responsive to the beat frequency between said carriers.

12. The combination in accordance with claim 10 wherein is provided means responsive to the beat frequencies between said carriers for generating voltage pulses proportional to said beat frequencies, and means for integrating adjacent pairs of said pulses to provide control pulses.

RAYMOND M. WILMOTTE.

References Cited in the file of this patent

UNITED STATES PATENTS

| Number | Name | Date |
|---|---|---|
| 2,164,032 | Day | June 27, 1939 |
| 2,233,183 | Roder | Feb. 25, 1941 |
| 2,413,296 | Deal et al. | Dec. 31, 1946 |
| 2,421,727 | Thompson | June 3, 1947 |
| 2,539,474 | Redard et al. | Jan. 30, 1951 |